Figure 1:
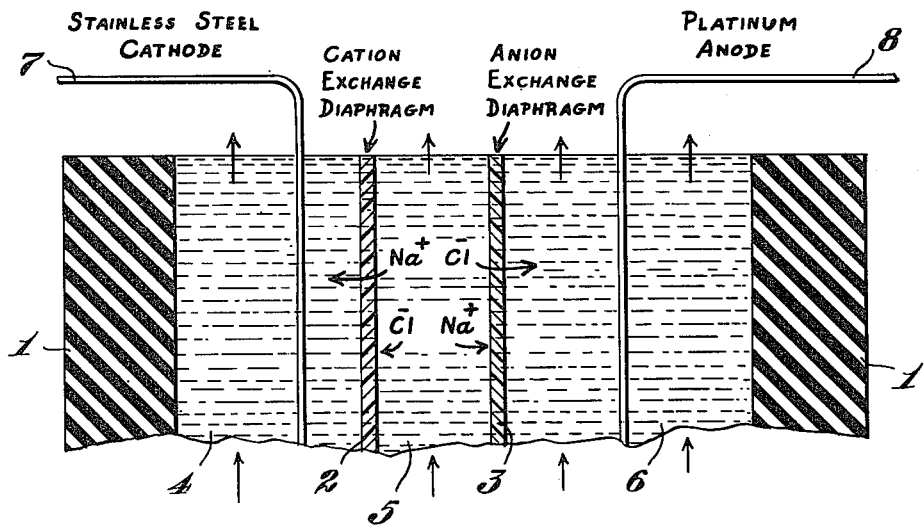

April 28, 1953

W. JUDA ET AL 2,636,852

METHOD OF ELECTRODIALYZING AQUEOUS
SOLUTIONS AND APPARATUS THEREFOR
Filed Feb. 28, 1950

Inventor
Walter Juda
Wayne A. McRae
by Roberts, Cushman & Grover
Att'ys

Patented Apr. 28, 1953

2,636,852

UNITED STATES PATENT OFFICE 2,636,852

METHOD OF ELECTRODIALYZING AQUEOUS SOLUTIONS AND APPARATUS THEREFOR

Walter Juda, Lexington, and Wayne A. McRae, Allston, Mass., assignors to Ionics Incorporated, Cambridge, Mass., a corporation of Massachusetts Application February 28, 1950, Serial No. 146,706

14 Claims. (Cl. 204—151)

The present invention relates to a method of treating water which contains in solution one or more electrolytes such as ionizable salts, acids or bases which it is desirable to remove in part or entirely therefrom or to convert into useful products, or both.

A typical example of waters which are susceptible to use or improvement by the present invention is sea water. But saline ground waters, and also prepared aqueous solutions or waste waters from commercial, residential and industrial activities, which have become polluted thereby including radioactive solutions, may likewise be treated or improved in respect of their electrolyte content.

The value and advantages of being able to improve the quality and purity of such waters are obvious, whether in whole or in part, as by rendering them pure or potable or simply sufficiently pure for safe disposal or for uses to which the natural or waste waters, as they occur, are not suitable or satisfactory. On the other hand, the products recovered from such waters or solutions may be converted into valuable industrial and commercial products, per se.

By the present invention it is discovered and determined that if a body or stream of water, which contains an electrolyte such as an ionizable salt or a plurality of salts or acids or bases, in solution, is placed in contact with a barrier comprising a cation exchange material and with a barrier comprising an anion exchange material, having high specific electrical conductivities, and also subjected to an electrolytic cathodic potential in the neighborhood of the cation exchange material and an anodic potential in the neighborhood of the anion exchange material (so that an electrolytic current is passed between them) electrolytic migration of the dissolved ions takes place.

The barrier of cation exchange material may be characterized as a region in which there is present a substantial number of negatively charged functional groups attached to a large molecular structure. The screening effect of this "fixed" negative charge will consist in repelling anions of the dissociated electrolyte in solution to a considerable extent causing its cations to move into and/or across this region in greater numbers, in an electrolytic current, thereby changing the ratio of the respective transference numbers of anions and cations through the region. Similarly, the barrier of the anion exchange material which may be characterized by a positive fixed charge causes a movement of anions in greater numbers thereto and/or therethrough.

There is accordingly realized a novel dialysis cell in which there takes place a selective migration and segregation of anions to and/or through the anion exchange material and of cations to and/or through the cation exchange material while the water between the exchange materials acquires a correspondingly purified condition with respect to its ionizable content. However, this purification depends upon the removal of ions in the electrolytic current in amounts exceeding the back diffusion of ions through concentration differentials which may exist in and/or in the neighborhood of the ion-exchange regions. Such back diffusion is effectively minimized by a preferred permselective membrane or diaphragm structure.

Furthermore if the anion exchange material is of permselective composition and structure and/or the cation exchange material is of permselective composition and structure, as described and claimed in copending application of Walter Juda and Wayne A. McRae, Serial No. 103,784, filed July 9, 1949, then the dissociated and segregated anions and/or cations of the solution, upon reaching the anion and cation exchange materials, respectively, are capable of continued migration into and through such permselective ion exchange materials and to the anode and cathode, respectively.

It follows, that by such procedures, a quiescent or agitated body or stream of water containing an electrolyte in solution may be batchwise or continuously purified by passing the same either into or through the cell (as in the form of a continuous stream) between a pair of cation and anion exchange materials, especially in the form of permselective ion exchange diaphragms or membranes, between which an electrolytic current is passed.

Preferably the electrolytic current should be of a sufficient potential to promote or to effect the electrolytic decomposition of the dissolved electrolytes by discharge at the electrodes.

A typical and representative example of carrying out the invention in practice will be described with respect to a common salt solution, which is similar in many respects to sea water or to saline ground waters generally, and with respect to a concentrated sodium chloride solution for the separation and recovery of sodium, as caustic soda, and of chlorine gas.

Figure 2:
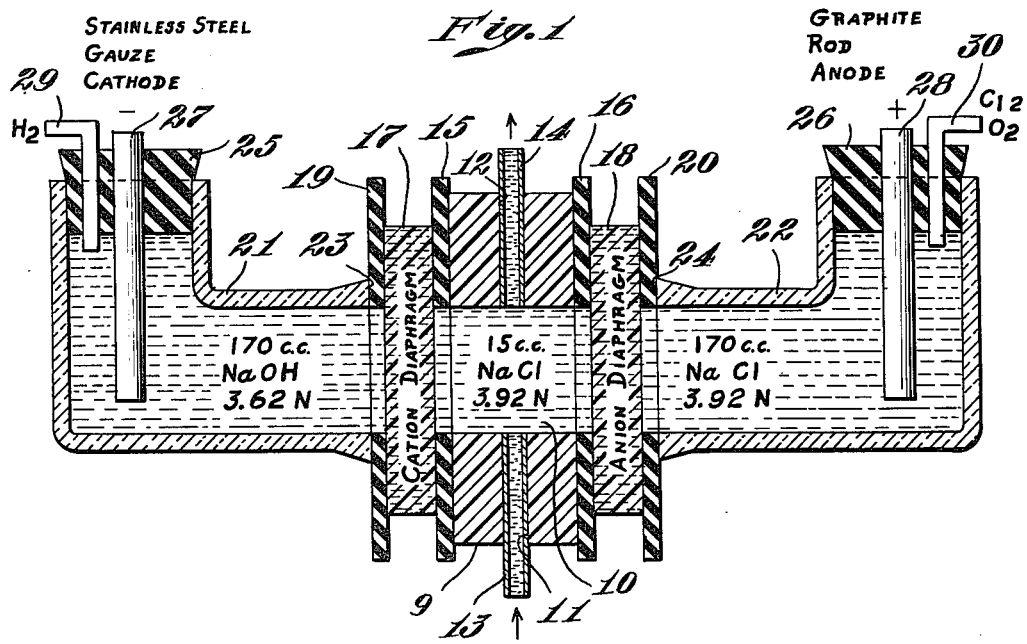

The apparatus which may be employed is illustrated in the accompanying drawings, in which:

Fig. 1 is a diagrammatic cross section of an ion-exchange cell arranged for the flow of solution of electrolyte through an inner chamber, between a pair of permselective cation and anion exchange membranes, and of solutions through two chambers along the outer sides of said ion exchange membranes; and Fig. 2 shows a similar three compartment ion-exchange cell, in cross section, the outer chambers being provided with glass walls.

A representative procedure for carrying out the invention in a cell of the form illustrated in the drawings will be described with respect to a solution resembling natural sea water, and also with respect to a more concentrated solution, such as a 4N solution of sodium chloride.

In the cell shown in Fig. 1 there is provided an outer wall 1, of rubber, and a pair of diaphragms of permselective ion-exchange material, comprising a cation exchange diaphragm 2 and an anion exchange diaphragm 3, which divide the cell into three separated compartments 4, 5, and 6 which may be closed, or open at each end (as shown) to permit the passage of the solution to be treated therethrough, at equal rates or other related rates of flow as desired, in the directions as indicated by the arrows. The cell is also provided with a cathode (e. g., of stainless steel) 7 mounted in the cathode compartment 4 and spaced approximately one-quarter inch from the cation exchange diaphragm 2, and an anode 8 (e. g., of platinum) mounted in the anode compartment 6 and spaced about one-half inch from the anion exchange diaphragm 3.

The permselective ion exchanger materials may be prepared in accordance with copending application of Walter Juda and Wayne A. McRae, Serial No. 103,784, filed July 9, 1949. Such ion exchange materials are typically selectively permeable to the transmigration of ions therethrough, of coherent, uniform structure and of increased electrical conductivity, of substantial ion exchange capacity and preferably of strongly acid and/or strongly basic and/or substantially dissociated salt characteristics, and of substantial cross-sectional dimensions, such as at least one-fourth inch in at least one dimension.

For example, the cation exchange diaphragm 2, in the instant case was prepared as follows:

*Preparation of membranes of phenol sulfonic acid-formaldehyde*

The impregnating, low molecular weight polymer was prepared as follows:

Parts by weight
Aqueous phenol sulfonic acid (65%) _____ 50
Aqueous formaldehyde (35.4%) _____ 24.7

The acid and the formaldehyde are shaken together and partially polymerized at 50° C. in a closed container (to retain the moisture and formaldehyde). This precuring requires 1½ to 2 hours after which the viscous mixture was poured into a mold to form the cast disks. The curing (until the polymer turned dark brown or black) was carried out at 100° C. in a closed system and in the presence of moisture. This process requires from two hours to two days depending upon the quantity and geometry of the polymerizing mass.

Before using, the diaphragm was conditioned by soaking in water and in 0.6 N sodium chloride solution to bring the water content to the saturation value and to convert the diaphragm to sodium form and thereafter maintained in wet condition throughout, for purposes of testing and use.

The anion exchange diaphragm was prepared as follows:

*Preparation of melamine-guanidine formaldehyde diaphragms*

| | Parts |
|---|---|
| Melamine | 126 |
| Guanidine carbonate | 90 |
| Aqueous formaldehyde (35.4%) | 243 |
| Aqueous hydrochloric acid (37%) | 162 |

The melamine and guanidine carbonate were combined with the acid and the formaldehyde was added to the mixture. At 110° C. the material would polymerize within four minutes. A low molecular weight polymer was obtained by heating to 40° C. for about forty-five minutes. This polymer was then used to prepare cast diaphragms. The curing conditions for the cast material were 75° C. and twelve hours in the presence of moisture. The curing of impregnated material was done at a higher temperature, 90° C., and also in the presence of moisture. Either of the diaphragms above described can likewise be made by impregnating materials such as Saran, or polyvinylidene chloride, in the form of cloth, or other like foraminous sheet materials, with the ion exchange material in low molecular form and liquid condition.

The ion-exchange component is preferably substantially water insoluble and characterized by having one of its ions, upon dissociation, remain integral with and fixed to the coherent structure of the ion-exchange material, while the other ion, upon dissociation, is released as a mobile, active ion, into the aqueous filled voids of the ion-exchange material or medium.

The membrane or diaphragm which is thus formed by the ion-exchange material or medium of the present invention is therefore typically of a coherent, uniform, electrically conductive, permselective structure, such as a continuous gel, in contrast to impermeable or non-conductive films or membranes or non-uniform, gelatinous precipitates or granular exchange materials of the prior art.

The permselective structure of the present invention may comprise or be composed of a binder material, with which the ion-exchange material is integrally associated, the ionic groups of the ion-exchange material being in oriented, dissociable relation with respect thereto and to the aqueous phase of the structure. The permselective structure of the invention may be composed of polymerized organic segments which are chemically combined with each other to constitute a coherent uniform structure, but which are also chemically combined with and form a part of the molecules of the ion-exchange component, per se. More particularly, the polymerized component is combined with the fixed ion of the ion-exchange component, which is oriented with respect to the polymerized component so as to be predominantly in the outer surface of the structure. Upon dissociation of the ion-exchange component, the fixed ion remains in the solid exposed surface of the structure, while the other ion becomes a mobile active ion, liberated in the aqueous filled voids.

The barriers used in this invention are described in greater detail in the above-mentioned copending application of Juda and McRae, Serial No. 103,784 filed July 9, 1949. In general, they are solid unfractured structures that comprise as an essential part extending substantially throughout a predominant amount of an ion exchange resin which comprises a synthetic organic polymeric matrix, dissociable ionic groups chemically bonded to the polymeric matrix and water in gel relationship with the matrix. The dissociable groups should have a dissociation constant (K) of at least $10^{-5}$ and should be present in an amount of at least 3.0 milliequivalent per gram of dry resin for groups having a (K) of between $10^{-5}$ and $10^{-3}$ and in an amount of at least 0.3 milliequivalent per gram of dry resin when (K) is $10^{-3}$ or greater. For the anion permeable barrier the groups are dissociable into free mobile anions with the positive cationic component bonded to the polymeric matrix to impart a fixed positive charge thereto; conversely for the cation permeable barrier the groups are dissociable into a free mobile cation with the negative anionic component bonded to the polymeric matrix imparting a fixed negative charge thereto.

The water in gel relationship with the polymeric matrix should be present in an amount of at least 15% of the weight of dry resin, and higher amounts, in excess of 25% of the weight of dry resin, are preferred.

A representative and preferred procedure for the preparation of such ion-exchange diaphragms of the present invention is to dissolve or disperse appropriate polymerizable organic compounds, in water, and then to effect polymerization, and especially curing to the water-insoluble stage, and preferably to the final stage of curing which is to be effected, of the thus dispersed reagents, in the aqueous medium as by heat, pressure, and the like, (without segregation or evaporation) whereupon the resulting polymer is constrained to cure to an integrated gel formation, throughout the dispersion, thereby to constitute a coherent structure, membrane or diaphragm of a shape and dimensions corresponding to those of the dispersion in which such curing takes place.

In such dispersion, polymerization and curing, if the polymerizing reagent materials possess or form a dissociable component, it is found that the aqueous dispersion effects and maintains the orientation of such component outwardly from the polymerizing and curing components towards and into the aqueous or dispersing phase, and that the polymerizing components tend to aggregate into and form a homogeneous continuous, solid, and ultimately coherent phase, occluding the aqueous phase.

Moreover by maintaining the liquid aqueous dispersing phase present and effective throughout the polymerization, without evaporation and without segregation, the cured polymer acquires and retains a gel structure, characterized by an extensive interface between the cured polymeric structure and the gel water, in the interfaces of which the dispersed, oriented, dissociable components are concentrated, and maintained subject to dissociation into a fixed ion therein, and a mobile active ion, which is free to migrate into and throughout the aqueous phase or gel water.

It is found that in order to effect and preserve these relationships and the free permeability of the solidified gel structure, throughout, the aqueous medium should form at least 15%, by weight, of the weight of the dry ion-exchange component, and should not at any time be allowed to become less, as by drying, etc., lest the continuous coherent structure of the whole should be disrupted or its exposed electric or surface characteristics and ion-exchange function be interfered with or destroyed.

It has now been found, for example, that solid, physically stable structures, including membranes, diaphragms, sheets, rods, tubes, vessels and objects of many different shapes (having at least one dimension greater than ¼") can be prepared presenting water-insoluble, coherent, ion-exchange materials of high specific conductivities. Preferably, in this invention, such ion-exchange materials are of high specific electrical conductivities, exceeding $.5 \times 10^{-2}$ ohm$^{-1} \times$cm$^{-1}$ and of high ion exchange capacities (e. g., of not less than 0.3 milliequivalent per gram of dry exchanger), and contain substantial amounts of dispersed water, not less than 15% of the weight of the air dry exchanger material and up to such proportions as might mechanically interfere with its uniform, coherent or permselective characteristics.

Such coherent structures may generally be made by casting, molding (including compression molding, if without substantial loss or segregation of the water component) and other conventional means of providing large continuous coherent structures of thermosetting or thermoplastic resins, except that the structures of this invention are made and mainained in aqueous media and/or an atmosphere of substantially saturated humidity, so as to prevent evaporation. In this manner the active groups attached to the polymeric organic matrix and oriented with respect to the interfaces thereof are partially or completely dissociable in the internal gel water into fixed ions of one sign linked to the polymer and into mobile ions of opposite sign. The latter are exchangeable ions and the main or substantially sole carriers of electric current.

Suitable active acidic functional groups linked to a polymeric matrix include —SO$_3$H, —COOH and the like, —SO$_3$H being preferred because of its high dissociation constant exceeding $10^{-3}$ in suitable resin-forming compounds. The exchangeable hydrogen ion may be partially or completely substituted by other substantially dissociated cations such as the alkali metal ions, the alkaline earth metal ions, namely, calcium, strontium, barium and radium, and also silver, copper, magnesium and ammonium ions, and the like. Typical polymeric matrices to which the functional groups are linked include phenol-aldehyde resins; polystyrene-divinylbenzene copolymers and the like. Similarly suitable active basic groups linked to polymeric matrices include quaternary ammonium hydroxides—

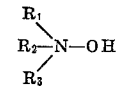

amino groups, the guanidyl group,

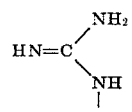

the dicyandiamidine group

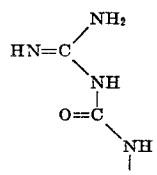

and the like organic nitrogen containing basic groups.

Quaternary ammonium hydroxide groups, the guanidine and the dicyandiamidine residue are among the preferred basic groups because of their high dissociation constant exceeding $10^{-3}$. Typical polymers to which active basic groups are linked include the urea-formaldehyde type resins, the melamine-formaldehyde type resins, the polyalkylene-polyamine-formaldehyde resins and the like. The exchangeable hydroxyl ions may be partially or completely substituted by other substantially dissociated anions such as $Cl^-$, $NO_3^-$, $SO_4^{--}$, and the like.

For example, in the instant case, a cation exchange diaphragm was prepared as described above to serve as the permselective cation exchange diaphragm 2 and an anion exchange diaphragm was prepared as described above to serve as the permselective anion exchange diaphragm 3, in the cell above described and illustrated in the drawings. All three of the compartments, thus formed, that is compartments 4, 5 and 6, were then filled with a salt solution resembling sea water and herein called "synthetic" sea water, prepared as follows:

An aqueous stock solution was prepared, which contained in 7 liters:

3,889.2 g. $MgCl_2.6H_2O$
405.5 g. anhydrous $CaCl_2$
14.79 g. $Sr.Cl_2.6H_2O$

A second aqueous stock solution was prepared containing in 7 liters:

486.15 g. $KCl$
140.73 g. $NaHCO_3$
70.35 g. $KBr$
19.04 g. $H_3BO_3$
2.10 g. $NaF$

Two hundred c. c. of the first stock solution were taken, which accordingly contained:

111.1200 g. $MgCl_2.6H_2O$
11.5857 g. $CaCl_2$
.4226 g. $Sr.Cl_2.6H_2O$

One hundred c. c. of the second stock solution were taken, which accordingly contained:

6.945 g. $KCl$
2.0104 g. $NaHCO_3$
1.005 g. $KBr$
.272 g. $H_3BO_3$
.030 g. $NaF$

To these 200 c. c. and 100 c. c. portions of the stock solutions were added 245.34 g. NaCl and 40.94 g. $Na_2SO_4$, making a total of 419.67 grams.

These components were made up to 10 liters with water and the pH value was adjusted to 8.2 with 0.1 N sodium carbonate solution. The resulting solution was filled into all three compartments of the cell. A direct electric current was then passed through the cell between the electrodes, 7 and 8, under a potential of 8 volts at a current density of about ⅓ ampere per square inch of cross section of the permselective diaphragms.

In this case the salt solution was slowly and equally circulated through each of the compartments 4, 5 and 6 at the rate of about 4 c. c. per minute. It was found that the effluent from the cathode compartment was strongly basic, when tested by pH paper. The effluent from the anode compartment evolved large quantities of chlorine gas. The effluent from the middle compartment was partly demineralized, as indicated by observers tasting the original solution and the effluent from compartment 5 and describing the latter as "less salty" than the solution as supplied to the cell.

The degree of demineralization depended upon the flow rate and the current, and could easily be followed by standard technique, such as conductivity measurements. For example, when "synthetic" sea water, which is approximately 0.65 N in dissolved salt, is passed through the cell at a rate of 5–10 c. c. per hours with a current of about 300 milliamperes, then the treated water is less than 0.01 N in dissolved salts.

In such arrangement and operation of the cell large currents were required for large rates of flow or with water having a high content of mineral salts in solution.

At a given rate of flow of solution in the anode and cathode compartments and the central compartment, the concentration of the solutions in the anode and cathode compartments showed an increase, while the concentration of the solution in the central compartment decreased, in passing through the cell while electrical current was passed. By such operation, therefore, the system is applicable for rendering natural waters which are brackish (by passing them through the central compartment 5) of low mineral or salt content and hence of a potable or even higher degree of purity.

The system can be further adapted for such purification of mineral waters, by effecting the demineralization in two stages, the first stage being designed for high electric currents and the second stage being designed and operated to remove the residual balance of minerals left in the water from the first stage of treatment. In such operation, during the first or second stage, an auxiliary anode may also be advantageously provided in the central channel or chamber 5, and operated upon a limited current to liberate free chlorine at this point and to leave it in solution, in the treated and otherwise substantially completely demineralized water coming therefrom as the purified product, as a bactericide.

In applying the method of the invention to more concentrated solutions of ionizable salts, a device such as shown in Fig. 2 may be used, in which a transparent block of synthetic resin 9 served to form the central or cell portion by boring a cylindrical passageway 10 through it and vertical intake 11 from the bottom into the passageway 10 and a vertical outlet 12 from the top into the passageway 10, to receive inlet and outlet connection tubes 13 and 14, respectively.

About the margins of the passageway 10 were provided gaskets 15, 16, to make a tight joint between them and the cation exchange diaphragm 17 and the anion exchange diaphragm 18, respectively. Similar gaskets 19 and 20 were placed against the outer surfaces of the cation diaphragm 17 and anion diaphragm 18, respectively, with which to make tight joints with the glass, elbow-shaped tubes 21, 22, respectively, at their opposed open ends 23, 24.

In this arrangement, the upwardly projecting open ends of the tubes 21, 22, were closed with rubber stoppers 25, 26, perforated to receive a cathode 27 and an anode 28, respectively, and also outlet or gas venting tubes 29, 30.

The glass tubes were 3.75 cm. inside diameter, and the distance from the face of each diaphragm to the center of the vertical arm of the corresponding glass tube was in each case 11 cm.

The total volume of the control chamber 10 and of the intake 13 and outlet 14 was 15 c. c.

The cathode was a disc of 100 mesh stainless steel gauze or similar inert material, 7 cm. in diameter and folded to fit into the glass tube, presenting a cathode having a surface area of about 38 square centimeters.

The anode consisted of a graphite rod 3.4 cm. long and 6 mm. in diameter, presenting a contact surface area of about 7 square centimeters.

An electric current was imposed across the cell, between the anode and cathode at a potential difference of 6 volts, to produce a current density at the anode of about 0.06 amp./sq. cm. and a current density at the cathode of about 0.011 amp./sq. cm.

The cation diaphragm was permselective and of uniform composition, structure and thickness (of 5 mm.) and consisted of a condensation product of phenol sulfonic acid and formaldehyde (while in aqueous dispersion) as described above, which had been converted by immersion in a 15% NaOH solution, and used directly after wiping only.

The anion diaphragm was also permselective and of uniform composition, structure and thickness (8 mm.) and consisted of a condensation product of melamine, guanidine and formaldehyde, (while in aqueous dispersion) which had been immersed in 4 N NaCl solution and was used without washing.

The edges of both diaphragms were enclosed in rubber protective sleeves (not shown).

To commence operation of the process the cathode chamber was filled with 170 c. c. of 3.62 N NaOH solution and the anode chamber was filled with 170 c. c. of 3.92 N NaCl solution. A 4 N NaCl solution was then flowed through the vertical inlet 13, upwardly into and through the chamber 10, and thence out through the outlet 14 at the rate of 4 c. c. per minute.

The cell was operated thus at a potential difference of 6 volts, and an average current of 0.415 amp. was set up and maintained for 1150 minutes.

At the conclusion of this operation, the solution in the anode chamber was analyzed and found to be strongly acidic, having a pH value of about 1.

The evolution of chlorine gas at the anode and of sodium hydroxide at the cathode were, each, in an amount equal to about 65% of the electrochemical equivalent of the quantity of electricity which had been passed through the cell.

From the foregoing description of the invention and of the examples and results obtained by applying it in actual practice, it is shown that aqueous solutions of ionizable salts may be subjected to electrolysis, and the resulting ions selectively segregated, and separated by permselective migration to and through their respective cation and/or anion permselective diaphragms, and thence to the cathode and anode, respectively. Further reactions may take place between the thus segregated ions, or their discharged molecules in the catholyte and anolyte respectively, such as $2Na^+ + H_2O \ldots 2NaOH + H_2$ which will tend to render the catholyte strongly alkaline and to liberate hydrogen gas and $6Cl^- + 2H_2O \ldots 4HCl + Cl_2 + O_2$, which will tend to render the anolyte strongly acidic and to liberate chlorine and some oxygen gas at the anode.

On the other hand, migration of anions to or through the cation exchange diaphragm has been effectively cut down or minimized. Likewise, migration of cations to or through the anion exchange diaphragm has been effectively cut down or minimized. To such extent as the cation or anion exchange diaphragm may be susceptible to or permit such contramigration of ions of opposite sign or charge therethrough, the efficiency of the cell will be correspondingly offset and reduced. This would also occur through physical fractures, leaks, or like faulty construction or operation of the cell.

The diaphragms are not, (when carefully made, and of uniform structure) pervious to nor capable of appreciable osmosis of pure water therethrough. Nonetheless, it is observed that there is a tendency for some water to migrate, for example, through the anion exchanger diaphragm into the anode chamber, with the chloride ions. This may be attributed in part to a hydration of the chloride ion which thereby serves as a carrier of water through the permselective diaphragm. Similarly such migration of water with the cation through the cationic exchanger diaphragm has been observed and may likewise be in part attributed to hydration of the sodium ion, which thereby serves as a carrier of water.

Of course, such transverse migration of water from the throughput solution in the central chamber, into and through the permselective diaphragms and into the cathode and anode chambers constitutes a loss of throughput of treated solution from the cell. But this is not necessarily large in degree or amount and may serve to prevent a countermigration of separated and segregated ions from the cathode and/or anode chambers into the central chamber of the cell. Moreover, the effect of such tendency is to dehydrate the solutions which are passed through the central compartment of the cell, which may in some instances be very desirable.

It is therefore demonstrated, from the above disclosure and examples, that by the process of the present invention water containing ionizable salts in solution, in relatively dilute concentrations, may be purified by the dissociation and selective segregation and separation of the component ions from solution therein. It is also demonstrated that more concentrated solutions of ionizable salts may be electrolyzed, and the resulting component ions segregated and selectively separated and collected to produce valuable products. In the latter case especially the solution treated may be only partially dissociated, with effective and economical production of the products derived therefrom, the residue of the treated solution being passed to waste or recirculated for retreatment or other treatment, as the case may be. In the case of treating dilute solutions of ionizable salts, or waters containing minor proportions of such salts, the recovery of the dissociated and segregated component ions may be of secondary importance only, compared to the purification of the throughput of water treated, which may be carried to substantially any degree of purification desired, by employing a sufficient quantity of electricity and/or conducting the process in successive stages of progressive dissociation and removal of the contained salts and like controls.

It should be understood that the present disclosure is for the purpose of illustration only and that this invention includes all modifications and equivalents which fall within the scope of the appended claims.

We claim:

1. The method of treating an electrolytic solution to modify the electrolytic concentration thereof comprising contacting said solution with (1) a barrier comprising as an essential part extending substantially throughout, a predominant amount of a cation exchange resin which comprises: an insoluble infusible synthetic organic polymeric matrix, ionic groups dissociable into a free mobile cation chemically bonded to said matrix imparting a negative charge thereto, and water in gel relationship with said matrix, said groups having a dissociation constant of at least $10^{-5}$ and being present in an amount of at least 0.3 milliequivalent per gram of dry resin, and said water being present in an amount of at least 15% of the weight of dry resin, and (2) a second barrier comprising as an essential part extending substantially throughout, a predominant amount of an anion exchange resin which comprises: an insoluble infusible synthetic organic polymeric matrix, ionic groups dissociable into a free mobile anion chemically bonded to said matrix imparting a positive charge thereto, and water in gel relationship with said matrix, said groups having a dissociation constant of at least $10^{-5}$ and being present in an amount of at least 0.3 milliequivalent per gram of dry resin, and said water being present in an amount of at least 15% of the weight of dry resin, and passing a direct electric current between said barriers and through said solution.

2. The method defined by claim 1 wherein the solution being treated is flowed between and in contact with said barriers.

3. The method of treating an electrolytic solution to remove electrolyte therefrom, as defined by claim 1, wherein the electric current is flowed in the direction to cause anions to migrate toward and through the second barrier.

4. The method of treating an electrolytic solution to increase or decrease its electrolytic concentration comprising (1) separating said solution from a first adjacent electrolytic solution by a barrier comprising as an essential part extending substantially throughout, a predominant amount of a cation exchange resin which comprises: an insoluble infusible synthetic organic polymeric matrix, ionic groups dissociable into a free mobile cation chemically bonded to said matrix imparting a negative charge thereto, and water in gel relationship with said matrix, said groups having a dissociation constant (K) of at least $10^{-5}$, said groups being present in an amount of at least 3.0 milliequivalents per gram of dry resin when K is between $10^{-5}$ and $10^{-3}$ and in an amount of at least 0.3 milliequivalent per gram of dry resin when K is $10^{-3}$ or greater, and said water being present in an amount of at least 25% of the weight of dry resin, (2) separating said solution from a second adjacent electrolytic solution by a second barrier comprising as an essential part extending substantially throughout, a predominant amount of an anion exchange resin which comprises: an insoluble infusible synthetic organic polymeric matrix, ionic groups dissociable into a free mobile anion chemically bonded to said matrix imparting a positive charge thereto, and water in gel relationship with said matrix, said groups having a dissociation constant (K) of at least $10^{-5}$, said groups being present in an amount of at least 3.0 milliequivalents per gram of dry resin when K is between $10^{-5}$ and $10^{-3}$ and in an amount of at least 0.3 milliequivalent per gram of dry resin when K is $10^{-3}$ or greater, and said water being present in an amount of at least 25% of the weight of dry resin, and (3) passing a direct electric current in series through said solutions and separating barriers.

5. The method defined by claim 4 wherein the solution being treated is flowed between and in contact with said barriers.

6. The method of treating an electrolytic solution to remove electrolyte therefrom, as defined by claim 4, wherein the electric current is flowed in the direction to cause anions to migrate toward and through the second barrier.

7. In an electrolytic cell which includes means for passing an electric current through an electrolytic solution therein, a compartment defined between (1) a barrier separating said compartment from a first adjacent compartment, said barrier comprising as an essential part extending substantially throughout, a predominant amount of a cation exchange resin which comprises: an insoluble infusible synthetic organic polymeric matrix, ionic groups dissociable into a free mobile cation chemically bonded to said matrix imparting a negative charge thereto, and water in gel relationship with said matrix, said groups having a dissociation constant of at least $10^{-5}$ and being present in an amount of at least 0.3 milliequivalent per gram of dry resin, and said water being present in an amount of at least 15% of the weight of dry resin, and (2) a second barrier separating said compartment from a second adjacent compartment, said barrier comprising as an essential part extending substantially throughout, a predominant amount of an anion exchange resin which comprises: an insoluble infusible synthetic organic polymeric matrix, ionic groups dissociable into a free mobile anion chemically bonded to said matrix imparting a positive charge thereto, and water in gel relationship with said matrix, said groups having a dissociation constant of at least $10^{-5}$ and being present in an amount of at least 0.3 milliequivalent per gram of dry resin, and said water being present in an amount of at least 15% of the weight of dry resin.

8. In an electrolytic cell which includes means for passing an electric current through an electrolytic solution therein, a compartment defined between (1) a barrier separating said compartment from a first adjacent compartment, said barrier comprising as an essential part extending substantially throughout, a predominant amount of a cation exchange resin which comprises: an insoluble infusible synthetic organic polymeric matrix, ionic groups dissociable into a free mobile cation chemically bonded to said matrix imparting a negative charge thereto, and water in gel relationship with said matrix, said groups having a dissociation constant (K) of at least $10^{-5}$, said groups being present in an amount of at least 3.0 milliequivalents per gram of dry resin when K is between $10^{-5}$ and $10^{-3}$ and in an amount of at least 0.3 milliequivalent per gram of dry resin when K is $10^{-3}$ or greater, and said water being present in an amount of at least 25% of the weight of dry resin; and (2) a second barrier separating said compartment from a second adjacent compartment, said barrier comprising as an essential part extending substantially throughout, a predominant amount of an anion exchange resin which comprises: an insoluble infusible synthetic organic polymeric matrix, ionic groups dissociable into a free mobile anion chemically bonded to said matrix imparting a positive charge thereto, and water in gel relationship with said matrix, said groups having a dissociation constant (K) of at least $10^{-5}$, said groups being present in an amount of at least 3.0 milliequivalents per gram of dry resin when K is between $10^{-5}$ and $10^{-3}$ and in an amount of at least 0.3 milliequivalent per gram of dry resin when K is $10^{-3}$ or greater, and said water being present in an amount of at least 25% of the weight of dry resin.

9. An electrolytic cell comprising a pair of electrodes and a compartment between said electrodes said compartment being defined between (1) a barrier comprising as an essential part extending substantially throughout, a predominant amount of a cation exchange resin which comprises: an insoluble infusible synthetic organic polymeric matrix, ionic groups dissociable into a free mobile cation chemically bonded to said matrix imparting a negative charge thereto, and water in gel relationship with said matrix, said groups having a dissociation constant of at least $10^{-5}$ and being present in an amount of at least 0.3 milliequivalent per gram of dry resin, and said water being present in an amount of at least 15% of the weight of dry resin and (2) a second barrier comprising as an essential part extending substantially throughout, a predominant amount of an anion exchange resin which comprises: an insoluble infusible synthetic organic polymeric matrix, ionic groups dissociable into a free mobile anion chemically bonded to said matrix imparting a positive charge thereto, and water in gel relationship with said matrix, said groups having a dissociation constant of at least $10^{-5}$ and being present in an amount of at least 0.3 milliequivalent per gram of dry resin, and said water being present in an amount of at least 15% of the weight of dry resin.

10. An electrolytic cell comprising a pair of electrodes and a compartment between said electrodes said compartment being defined between (1) a barrier comprising as an essential part extending substantially throughout, a predominant amount of a cation exchange resin which comprises: an insoluble infusible synthetic organic polymeric matrix, ionic groups dissociable into a free mobile cation chemically bonded to said matrix imparting a negative charge thereto, and water in gel relationship with said matrix, said groups having a dissociation constant (K) of at least $10^{-5}$, said groups being present in an amount of at least 3.0 milliequivalents per gram of dry resin when K is between $10^{-5}$ and $10^{-3}$ and in an amount of at least 0.3 milliequivalent per gram of dry resin when K is $10^{-3}$ or greater, and said water being present in an amount of at least 25% of the weight of dry resin and (2) a second barrier comprising as an essential part extending substantially throughout, a predominant amount of an anion exchange resin which comprises: an insoluble infusible synthetic organic polymeric matrix, ionic groups dissociable into a free mobile anion chemically bonded to said matrix imparting a positive charge thereto, and water in gel relationship with said matrix, said groups having a dissociation constant (K) of at least $10^{-5}$, said groups being present in an amount of at least 3.0 milliequivalents per gram of dry resin when K is between $10^{-5}$ and $10^{-3}$ and in an amount of at least 0.3 milliequivalent per gram of dry resin when K is $10^{-3}$ or greater, and said water being present in an amount of at least 25% of the weight of dry resin.

11. An electrolytic cell comprising a pair of electrodes and a compartment between said electrodes said compartment being defined between (1) a barrier comprising as an essential part extending substantially throughout, a predominant amount of a cation exchange resin which comprises: an insoluble infusible synthetic organic polymeric matrix, ionic groups dissociable into a free mobile cation chemically bonded to said matrix imparting a negative charge thereto, and water in gel relationship with said matrix, said groups having a dissociation constant of at least $10^{-5}$ and being present in an amount of at least 0.3 milliequivalent per gram of dry resin, and said water being present in an amount of at least 15% of the weight of dry resin and (2) a second barrier comprising as an essential part extending substantially throughout, a predominant amount of an anion exchange resin which comprises: an insoluble infusible synthetic organic polymeric matrix, ionic groups dissociable into a free mobile anion chemically bonded to said matrix imparting a positive charge thereto, and water in gel relationship with said matrix, said groups having a dissociation constant of at least $10^{-5}$ and being present in an amount of at least 0.3 milliequivalent per gram of dry resin, and said water being present in an amoun of at least 15% of the weight of dry resin, and means for flowing an electrolytic solution through said compartment.

12. An electrolytic cell comprising a pair of electrodes and a compartment between said electrodes said compartment being defined between (1) a barrier comprising as an essential part extending substantially throughout, a predominant amount of a cation exchange resin which comprises: an insoluble infusible synthetic organic polymeric matrix, ionic groups dissociable into a free mobile cation chemically bonded to said matrix imparting a negative charge thereto, and water in gel relationship with said matrix, said groups having a dissociation constant (K) of at least $10^{-5}$, said groups being present in an amount of at least 3.0 milliequivalents per gram of dry resin when K is between $10^{-5}$ and $10^{-3}$ and in an amount of at least 0.3 milliequivalent per gram of dry resin when K is $10^{-3}$ or greater, and said water being present in an amount of at least 25% of the weight of dry resin and (2) a second barrier comprising as an essential part extending substantially throughout, a predominant amount of an anion exchange resin which comprises: an insoluble infusible synthetic organic polymeric matrix, ionic groups dissociable into a free mobile anion chemically bonded to said matrix imparting a positive charge thereto, and water in gel relationship with said matrix, said groups having a dissociation constant (K) of at least $10^{-5}$, said groups being present in an amount of at least 3.0 milliequivalents per gram of dry resin when K is between $10^{-5}$ and $10^{-3}$ and in an amount of at least 0.3 milliequivalent per gram of dry resin when K is $10^{-3}$ or greater, and said water being present in an amount of at least 25% of the weight of dry resin, and means for flowing an electrolytic solution through said compartment.

13. The method of treating natural waters, including sea water, to remove dissolved electrolyte therefrom comprising separating a first body of said water from a second body of said water by a barrier comprising as an essential part extending substantially throughout, a predominant amount of a cation exchange resin which comprises: an insoluble infusible synthetic organic polymeric matrix, ionic groups dissociable into a free mobile cation chemically bonded to said matrix imparting a negative charge thereto, and water in gel relationship with said matrix, said groups having a dissociation constant (K) of at least $10^{-5}$, said groups being present in an amount of at least 3.0 milliequivalents per gram of dry resin when K is between $10^{-5}$ and $10^{-3}$ and in an amount of at least 0.3 milliequivalents per gram of dry resin when K is $10^{-3}$ or greater, and said water being present in an amount of at least 25% of the weight of dry resin, (2) separating said first body from a third body of said water by a second barrier comprising as an essential part extending substantially throughout, a predominant amount of an anion exchange resin which comprises: an insoluble infusible synthetic organic polymeric matrix, ionic groups dissociable into a free mobile anion chemically bonded to said matrix imparting a positive charge thereto, and water in gel relationship with said matrix; said groups having a dissociation constant (K) of at least $10^{-5}$, said groups being present in an amount of at least 3.0 milliequivalents per gram of dry resin when K is between $10^{-5}$ and $10^{-3}$ and in an amount of at least 0.3 milliequivalent per gram of dry resin when K is $10^{-3}$ or greater, and said water being present in an amount of at least 25% of the weight of dry resin; and (3) passing a direct electric current in series through said solutions and separating barriers in the direction to cause anions to migrate toward and through the second barrier.

14. The method defined by claim 13 wherein the said bodies of water are flowed past and in contact with said barriers.

WALTER JUDA.
WAYNE A. McRAE.

References Cited in the file of this patent

UNITED STATES PATENTS

| Number | Name | Date |
|---|---|---|
| 1,326,106 | Schwerin | Dec. 23, 1919 |
| 1,546,908 | Lapenta | July 21, 1925 |
| 2,428,329 | Ham et al. | Sept. 30, 1947 |
| 2,502,614 | Zender | Apr. 4, 1950 |
| 2,510,262 | Sollner et al. | June 6, 1950 |

OTHER REFERENCES

"Journal of The Electrochemical Society," vol. 97, No. 7, July 1950, pages 139C thru 151C.

"Helvetica Chimica Acta," vol. 23 (1940), pages 795 thru 800.

"Kolloid Zeitschrift," vol. 88 (1939), pages 257 thru 273; vol. 112 (1949), pages 21 thru 26.